US010165182B1

(12) United States Patent
Chen

(10) Patent No.: US 10,165,182 B1
(45) Date of Patent: Dec. 25, 2018

(54) PANORAMIC IMAGING SYSTEMS BASED ON TWO LATERALLY-OFFSET AND VERTICALLY-OVERLAP CAMERA MODULES

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 133 days.

(21) Appl. No.: 15/394,596

(22) Filed: Dec. 29, 2016

(51) Int. Cl.
*H04N 5/232* (2006.01)
*H04N 5/225* (2006.01)
*H04N 5/265* (2006.01)
*H04N 7/18* (2006.01)

(52) U.S. Cl.
CPC ....... *H04N 5/23238* (2013.01); *H04N 5/2252* (2013.01); *H04N 5/2253* (2013.01); *H04N 5/2257* (2013.01); *H04N 5/2258* (2013.01); *H04N 5/265* (2013.01)

(58) Field of Classification Search
CPC .................................................. H04N 5/23238
USPC ........................................................ 348/48
See application file for complete search history.

(56) References Cited

U.S. PATENT DOCUMENTS

| 6,809,887 | B1 * | 10/2004 | Gao | G02B 13/06 348/48 |
| 9,374,529 | B1 * | 6/2016 | Kozko | H04N 5/2254 |
| 9,521,321 | B1 * | 12/2016 | Kozko | H04N 5/23238 |
| 2013/0329003 | A1 * | 12/2013 | Hsia | H04N 5/23238 348/36 |
| 2017/0099426 | A1 * | 4/2017 | Okunami | H04N 5/23212 |
| 2017/0227162 | A1 * | 8/2017 | Saika | F16M 13/02 |

* cited by examiner

*Primary Examiner* — Leron Beck

(57) ABSTRACT

Panoramic imaging systems and devices are disclosed. In one aspect, a disclosed panoramic camera assembly of a panoramic imaging system includes a first camera module including a first wide-angle-lens camera positioned to cover one half of a full spherical space and a second camera module including a second wide-angle-lens camera positioned to cover the other half of the full spherical space. Moreover, the optical axis of the first camera and the optical axis of the second camera are separated by a predetermined distance in a lateral direction perpendicular to the optical axes. Furthermore, the first camera module and the second camera module are positioned to have a predetermined amount of overlap in the vertical direction so that a height of the panoramic camera assembly is significantly smaller than a dimension of the first camera module plus a dimension of the second camera module in the vertical direction.

20 Claims, 7 Drawing Sheets

PANORAMIC IMAGING SYSTEMS BASED ON TWO LATERALLY-OFFSET AND VERTICALLY-OVERLAP CAMERA MODULES

TECHNICAL FIELD

The present disclosure relates to the field of panoramic imaging, and more specifically to the design of multi-camera panoramic systems capable of generating 360°×180° full spherical photographs and videos.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, main-stream panoramic imaging solutions can be generally categorized into the multi-lens approach and the single-lens approach. Multi-lens panoramic camera systems utilize a set of cameras for simultaneous image or video capturing. The cameras are typically arranged in either a parallel fashion or a converged fashion, such that each camera's field of view overlaps with that of at least one other camera. This way, the total field of view covered by the multi-camera systems is significantly enlarged as compared to a conventional single-lens camera.

Existing multi-lens panoramic camera systems are typically based on wide-angle fisheye lens cameras. For example, one common implementation of a panoramic camera system is based on using a two-fisheye-lens-camera combination, wherein each of the two lenses captures 180° of hemispherical images. Next, the two sets of images captured by the two fisheye lenses are stitched together to achieve a full 360°×180° panoramic view. However, the existing two-fisheye-lens camera systems are often bulky in size. As such, these systems are both difficult to carry around and expensive to manufacture.

SUMMARY

Disclosed are various designs of panoramic imaging systems and devices to enable 360°×180° full spherical imaging based on two ultra wide-angle-lens cameras. Specifically, some embodiments of the present disclosure provide panoramic imaging systems based on two laterally-offset vertically-overlap ultra wide-angle-lens cameras. When two ultra wide-angle-lens cameras are sufficiently separated in the horizontal/lateral direction, i.e., the direction perpendicular to the optical axis of the cameras, the two cameras can then be brought much closer in the vertical/optical axis direction, because neither camera will be physically blocking the other camera in that direction. As a result, the disclosed panoramic imaging systems based on two laterally-offset vertically-overlap cameras can be constructed to have much smaller dimensions in the vertical/optical axis direction. The proposed camera assembly designs significantly reduce the overall sizes of the panoramic imaging systems, thereby making them more suitable for carrying. Furthermore, by significantly reducing the distance between the two ultra wide-angle-lens cameras, the disclosed panoramic imaging systems largely mitigate the issues of large parallax and large stitching gaps between the two channels of image data associated with existing panoramic imaging systems based on two back-to-back ultra wide-angle-lens cameras.

In one aspect, a panoramic camera assembly is disclosed. This panoramic camera assembly includes a first camera module including a first wide-angle-lens camera and positioned such that an optical axis of the first wide-angle-lens camera points to a vertical direction to cover one half of a full spherical space. The panoramic camera assembly also includes a second camera module including a second wide-angle-lens camera and positioned such that an optical axis of the second wide-angle-lens camera points to a second direction opposite to the vertical direction to cover the other half of the full spherical space. Moreover, the optical axis of the first wide-angle-lens camera and the optical axis of the second wide-angle-lens camera are separated by a predetermined distance in a lateral direction perpendicular to the vertical direction. Further, the first camera module and the second camera module are positioned to have a predetermined amount of overlap in the vertical direction so that a height of the panoramic camera assembly between a first apex of the first wide-angle-lens camera and a second apex of the second wide-angle-lens camera is significantly smaller than a dimension of the first camera module in the vertical direction plus a dimension of the second camera module in the vertical direction.

In some embodiments, each of the first and second wide-angle-lens cameras is a fisheye lens camera.

In some embodiments, the predetermined distance in the lateral direction is equal to or greater than a dimension of the first camera module or the second camera module in the lateral direction.

In some embodiments, the predetermined amount of overlap in the vertical direction is greater than one half of the dimension of the first camera module or the second camera module in the vertical direction.

In some embodiments, the panoramic camera assembly also includes camera mount positioned between the first camera module and the second camera module. This camera mount further includes: a first hollow space located on a front side and below a first surface of the camera mount for receiving the first camera module; and a second hollow space located on a back side of the camera mount opposite to the front side and below a second surface of the camera mount for receiving the second camera module. The first hollow space is sufficiently offset from the second hollow space in the lateral direction so that the first hollow space and the second hollow space substantially do not overlap in the lateral direction, and the first hollow space overlaps with the second hollow space in the vertical direction.

In some embodiments, the first camera module is positioned substantially within the first hollow space while the first apex of the first wide-angle-lens camera is positioned above the first surface of the camera mount and the second camera module is positioned substantially within the second hollow space while the second apex of the second wide-angle-lens camera is positioned above the second surface of the camera mount.

In some embodiments, the panoramic camera assembly additionally includes a first circuit board attached to the first surface of the camera mount and a second circuit board attached to the second surface of the camera mount. The first circuit board includes a first set of electronics and electrical connectors, and wherein the second circuit board includes a second set of electronics and electrical connectors.

In some embodiments, the first camera module further includes a first flexible printed circuit (FPC) coupled to the sensors of the first wide-angle-lens camera at a first end of the first FPC, and the first FPC includes a first electrical connector at a second end of the first FPC which is electrical coupled to the first circuit board. Moreover, the second camera module further includes a second FPC coupled to the sensors of the second wide-angle-lens camera at a first end of the second FPC, and wherein the second FPC includes a second electrical connector at a second end of the second FPC which is electrical coupled to the second circuit board.

In some embodiments, the first camera module is configured to couple image data gathered by the first camera module to the first circuit board through the first FPC and the second camera module is configured to couple image data gathered by the second camera module to the second circuit board through the second FPC.

In some embodiments, the panoramic camera assembly further includes a third FPC configured to electrically couple the first circuit board and the second circuit board, and the second circuit board is configured to transmit the image data gathered by the second camera module to the first circuit board through the third FPC.

In some embodiments, the first circuit board includes an IC chip configured to combine the image data gathered by the first camera module and the second camera module and transmit the combined image data to a processor to generate full panoramic images.

In another aspect, a panoramic imaging system is disclosed. This panoramic imaging system includes a protective housing and a controller that includes at least one processor and is enclosed by the protective housing. The panoramic imaging system further includes a panoramic camera assembly electrically coupled to the controller. This panoramic camera assembly includes: a first camera module including a first wide-angle-lens camera and positioned such that an optical axis of the first wide-angle-lens camera points to a vertical direction to cover one half of a full spherical space; and a second camera module including a second wide-angle-lens camera and positioned such that an optical axis of the second wide-angle-lens camera points to a second direction opposite to the vertical direction to cover the other half of the full spherical space. Moreover, the optical axis of the first wide-angle-lens camera and the optical axis of the second wide-angle-lens camera are separated by a predetermined distance in a lateral direction perpendicular to the vertical direction. Further, the first camera module and the second camera module are positioned to have a predetermined amount of overlap in the vertical direction so that a height of the panoramic camera assembly between a first apex of the first wide-angle-lens camera and a second apex of the second wide-angle-lens camera is significantly smaller than a dimension of the first camera module in the vertical direction plus a dimension of the second camera module in the vertical direction.

In some embodiments, the panoramic camera assembly further includes a first circuit board attached to the first surface of the camera mount and a second circuit board attached to the second surface of the camera mount, wherein the first circuit board includes a first set of electronics and electrical connectors, and wherein the second circuit board includes a second set of electronics and electrical connectors.

In some embodiments, the first camera module is configured to couple image data gathered by the first camera module to the first circuit board and the second camera module is configured to couple image data gathered by the second camera module to the second circuit board. Moreover, the panoramic camera assembly further includes a flexible printed circuit (FPC) configured to electrically couple the first circuit board and the second circuit board, and the second circuit board is configured to transmit the image data gathered by the second camera module to the first circuit board through the FPC.

In some embodiments, the first circuit board includes an IC chip configured to combine the image data gathered by the first camera module and the second camera module and transmit the combined image data to the controller to generate full panoramic images by the at least one processor.

DETAILED DESCRIPTION

Figure 1:
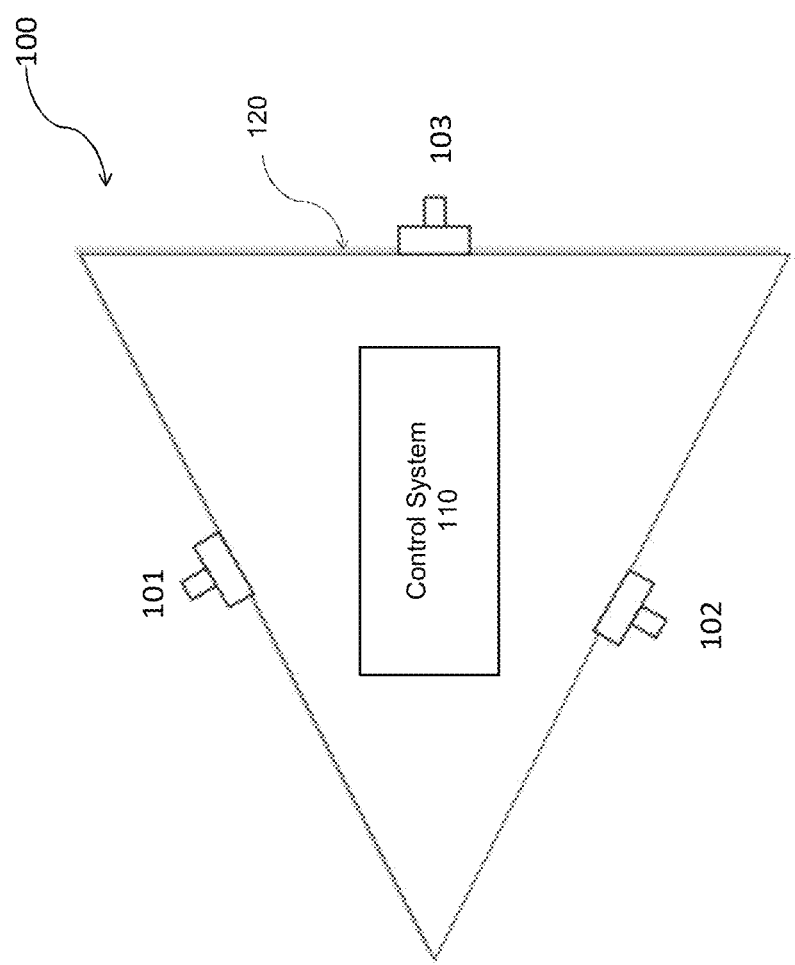
FIG. 1 is a schematic top view of an example panoramic imaging system according to certain aspects of the disclosure.

Disclosed are various designs of panoramic imaging systems and devices to enable 360°×180° full spherical imaging based on two ultra wide-angle-lens cameras. Specifically, some embodiments of the present disclosure provide panoramic imaging systems based on two laterally-offset vertically-overlap ultra wide-angle-lens cameras. When two ultra wide-angle-lens cameras are sufficiently separated in the horizontal/lateral direction, i.e., the direction perpendicular to the optical axis of the cameras, the two cameras can then be brought much closer in the vertical/ optical axis direction, because neither camera will be physically blocking the other camera in that direction. As a result, the disclosed panoramic imaging systems based on two laterally-offset vertically-overlap cameras can be constructed to have much smaller dimensions in the vertical/ optical axis direction. The proposed camera assembly designs significantly reduce the overall sizes of the panoramic imaging systems, thereby making them more suitable for carrying. Furthermore, by significantly reducing the distance between the two ultra wide-angle-lens cameras, the disclosed panoramic imaging systems largely mitigate the issues of large parallax and large stitching gaps between the two channels of image data associated with existing panoramic imaging systems based on two back-to-back ultra wide-angle-lens cameras.

In one aspect, a panoramic camera assembly is disclosed. This panoramic camera assembly includes a first camera module including a first wide-angle-lens camera and positioned such that an optical axis of the first wide-angle-lens camera points to a vertical direction to cover one half of a full spherical space. The panoramic camera assembly also includes a second camera module including a second wide-angle-lens camera and positioned such that an optical axis of the second wide-angle-lens camera points to a second direction opposite to the vertical direction to cover the other half of the full spherical space. Moreover, the optical axis of the first wide-angle-lens camera and the optical axis of the second wide-angle-lens camera are separated by a predetermined distance in a lateral direction perpendicular to the vertical direction. Further, the first camera module and the second camera module are positioned to have a predetermined amount of overlap in the vertical direction so that a height of the panoramic camera assembly between a first apex of the first wide-angle-lens camera and a second apex of the second wide-angle-lens camera is significantly smaller than a dimension of the first camera module in the vertical direction plus a dimension of the second camera module in the vertical direction.

In another aspect, a panoramic imaging system is disclosed. This panoramic imaging system includes a protective housing and a controller that includes at least one processor and is enclosed by the protective housing. The panoramic imaging system further includes a panoramic camera assembly electrically coupled to the controller. This panoramic camera assembly includes: a first camera module including a first wide-angle-lens camera and positioned such that an optical axis of the first wide-angle-lens camera points to a vertical direction to cover one half of a full spherical space; and a second camera module including a second wide-angle-lens camera and positioned such that an optical axis of the second wide-angle-lens camera points to a second direction opposite to the vertical direction to cover the other half of the full spherical space. Moreover, the optical axis of the first wide-angle-lens camera and the optical axis of the second wide-angle-lens camera are separated by a predetermined distance in a lateral direction perpendicular to the vertical direction. Further, the first camera module and the second camera module are positioned to have a predetermined amount of overlap in the vertical direction so that a height of the panoramic camera assembly between a first apex of the first wide-angle-lens camera and a second apex of the second wide-angle-lens camera is significantly smaller than a dimension of the first camera module in the vertical direction plus a dimension of the second camera module in the vertical direction.

FIG. 1 is a schematic top view of an example panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes cameras 101, 102, 103, a control system 110, and a housing 120. Each of cameras 101, 102 and 103 may be a digital camera. In some aspects, each of cameras 101, 102 and 103 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101, 102 and 103 are distributed evenly across on a frame of housing 130, for example, on three vertices of the frame with a triangle shape. Each of cameras 101, 102 and 103 may face a ⅓ of a 360° field. It can be appreciated that cameras 101, 102 and 103 may be distributed in any other arrangement and each of cameras 101, 102 and 103 may face any portion of a 360° field.

Although the above example shows three cameras within panoramic imaging system 100, panoramic imaging system 100 can generally include two or more cameras. In some particular embodiments, only two ultra wide-angle-lens cameras, such as two fisheye lens cameras are used within panoramic imaging system 100. These two ultra wide-angle-lens cameras can be integrated as a panoramic cameras assembly. Some examples of this panoramic cameras assembly which can be used within panoramic imaging system 100 as a two-camera system are provided below in conjunction with FIGS. 3-5B. In some embodiments, control system 110 of panoramic imaging system 100 can be integrated with the disclosed panoramic cameras assembly.

The control system 110 may include one or more electronic circuitries, such as a system on chip (SOC) with A field-programmable gate array (FPGA), Accelerated Processing Unit (APU) and peripheral electronic circuitries, for processing the image data captured by cameras 101-103 to produce wide to entire 360° panoramas, including both still images and movies. It can now be appreciated that outputs of panoramic imaging system 100 may be panoramas stitched from a set of original images captured by cameras 101-103.

Cameras 101-103 and the control system 110 may be enclosed in housing 120, such as a protective housing to reduce environmental effects on the components. In some embodiments, the protective housing is waterproof, dustproof, shockproof, freeze-proof, or any combination thereof. In some aspects, housing 120 may include one or more mechanical parts for mounting, housing and/or moving the cameras 101-103 and/or other optical components. Furthermore, in some embodiments, cameras 101-103 can be reversibly coupled to or detached from the remaining system, such that an end user may select different models of cameras 101-103 to be used with panoramic imaging system 100 according to particular needs or preferences.

It can be appreciated that a variety of embodiments of cameras 101-103 may be employed. These embodiments may have different numbers and/or arrangements of cameras than cameras 101-103, but a common feature may be that each camera's field of view overlaps with that of at least one other camera, thereby enabling panoramic imaging system 100 to capture a total field of view according to the design. Another common feature may be that the number and arrangement of cameras in system 100 will ensure that, when panoramic imaging system 100 is used to shoot panoramic videos, target objects in any given direction are captured by at least two cameras in system 100 so that the target object show up in at least two binocular-vision/stereoscopic video images to be used to construct 3D images of the target objects.

Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
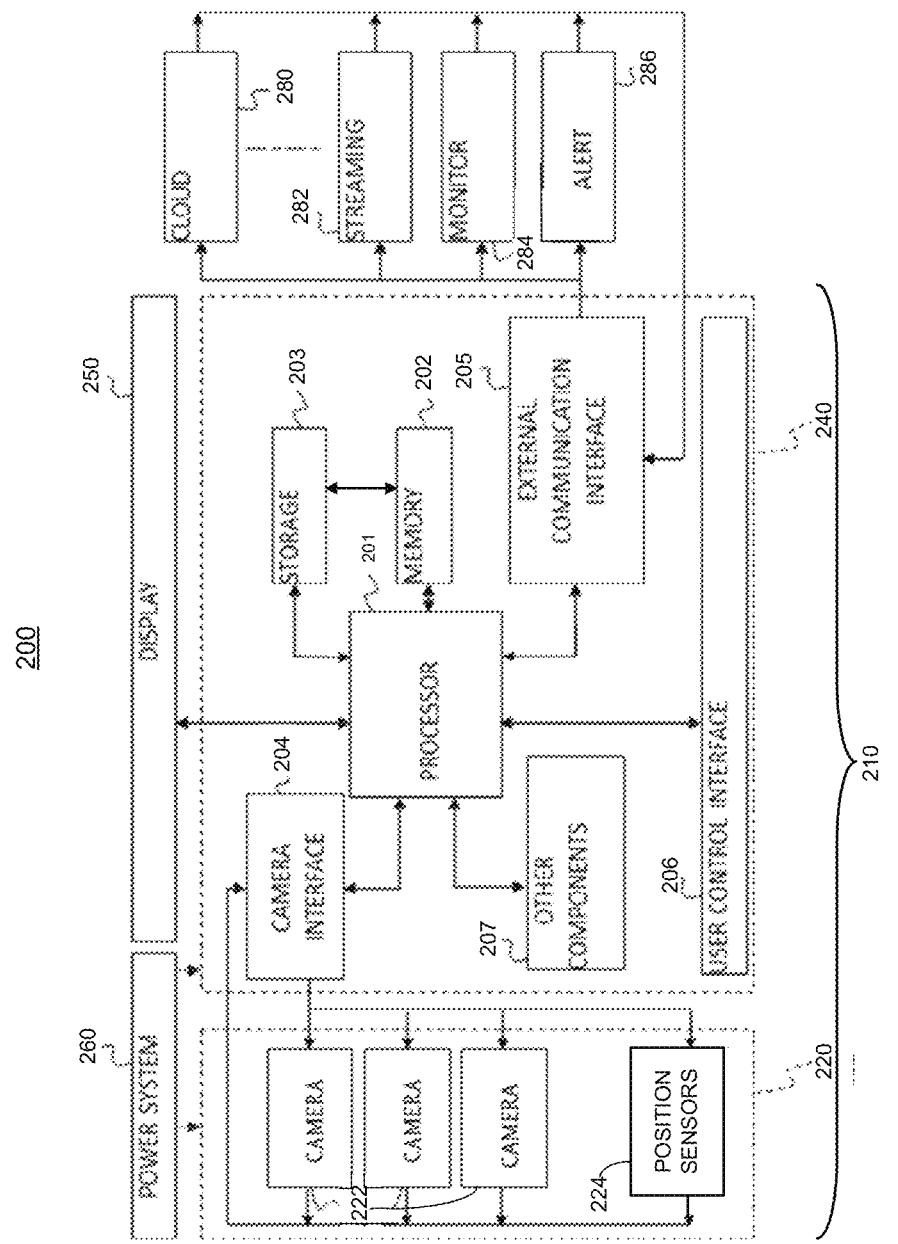
FIG. 2 conceptually illustrates an exemplary electronic system including a panoramic imaging system and various peripheral modules configured in an internet-enabled application environment with which some implementations of the subject technology can be implemented.

FIG. 2 conceptually illustrates an exemplary electronic system 200 including a panoramic imaging system 210 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic imaging system 210 within exemplary panoramic imaging electronic system 200 may be implemented by panoramic imaging system 100 as described above with reference to FIG. 1. According to the present disclosure, the example panoramic imaging system 210 further includes an optical system 220 which includes a plurality of cameras 222, and a control system 240 that controls the functions of the optical system 220 and includes at least an image processing program to process image data output from optical system 220. The plurality of cameras 222 may be implemented by cameras 101-103 in system 100. However, the plurality of cameras 222 may include fewer or more cameras than cameras 101-103 in system 100.

Control system 240 described in FIG. 2 may be used to implement control system 110 described in FIG. 1. Particularly, the control system 240 includes at least a processor 241, a memory 242, a storage device 243, a camera interface 244, an external communication interface 245, and a user control interface 246. The control system 240 can be a general-purpose computer system such as a Personal Computer (PC), or preferably a custom-designed computing system. Particularly in some embodiments, the control system 240 is a system on chip (SOC); that is, an integrated circuit (IC) integrates all components and functions of the control system 240 into a single chip, which makes the present panoramic imaging system 210 portable and electronically durable as a mobile device. In some embodiments, the control system 240 may be located internally within a same housing where the optical system 220 is located. Alternatively, in other embodiments, the control system 240 is separated from the optical system 220 to allow end users' selection of different models of an optical system 220 to be used with the control system 240.

The storage device 203 is preloaded with at least the image processing programs of the present disclosure, including panoramic image capturing and stitching programs. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 201 carries out instructions of the various algorithms. Thus, the various software programs, stored on the storage device 203 and executed in the memory 202 by the processor 201, direct the control system 240 to act in concert with the optical system 220 to perform various functions, which include but are not limited to receiving commands from an end user or an external device or service 280, 282, 284 and 286, defining the precise geometry of the cameras 222, commanding the cameras 222 to capture raw image data, tagging and storing raw data and sensor signals in a local storage device 203 and/or commuting raw data to an external device or service 280, 282, 284 and 286, processing raw video data and position sensor signals to compute angular and linear positions of optical system 220 and subsequently generate adjusted and stabilized panoramic videos to account for the shaking and other motion disturbances of optical system 220, presenting generated stabilized panoramas on a local display 250 and/or communicating generated stabilized panoramas to be stored or presented on an external device or service 280, 282, 284 and 286.

The processor 201 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 240 may employ a multi-core processor that has two or more CPUs or array processors that have multiple processors operating in parallel. In some embodiments, the processor 201 is an application specific integrated circuit (ASIC) that is designed for a particular use rather than for general purpose use. Particularly, in some embodiments, the processor 201 is a digital signal processor (DSP) designed for digital signal processing. More particularly, in some embodiments, the processor 201 is an on-chip image processor, specialized for image processing in a portable camera system. In some embodiments, the control system 240 includes a graphic processing unit (GPU), which has a massively parallel architecture consisting of thousands of smaller, more efficient cores designed for handling multiple tasks simultaneously. Particularly, in some embodiments, the control system 240 may implement GPU-accelerated computing, which offloads compute-intensive portions of an algorithm to the GPU while keeping the remainder of the algorithm to run on the CPU.

The memory 202 and the storage 203 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 240 is a single chip system, the memory 202 and storage 203 blocks are also integrated on-chip with the processor 201 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 201 retrieves instructions to execute and data to process in order to execute the processes of some implementations.

The camera interface 204 of the present disclosure can be any form of command and data interface usable with a camera 222, such as a digital. The camera interface 204 of the present disclosure can also be any form of command and data interface to communicate with position sensors 224. Exemplary embodiments include USB, FireWire and any other interface for command and data transfer that may be commercially available. Additionally, it is preferred, although not required, that the optical system 220 be equipped with a single digital control line that would allow a single digital signal to command all the cameras 222 and sensors 224 simultaneously to capture an image of a scene and to acquire positional signals of the camera body.

The external communication interface 205 of the present disclosure can be any data communication interface, and may employ a wired, fiber-optic, wireless, or another method for connection with an external device or service 280, 282, 284 and 286. Ethernet, wireless-Ethernet, Bluetooth, USB, FireWire, USART, SPI are exemplary industry standards. In some embodiments, where the control system 240 is a single chip system, the external communication interface 205 is integrated on-chip with the processor 201 as well as other peripherals and interfaces.

The user control interface 206 of the present disclosure can be any design or mode that allows effective control and operation of the panoramic 3D imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 240 of the present disclosure may further include other components 207 that facilitate its function. For example, control system 240 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 240 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 240 may optionally be equipped with a light sensor for environmental light conditions, so that control system 240 can automatically adjust hardware and/or software parameters of the system.

In some embodiments, the present electronic system 200 is further equipped with an internal power system 260 such as a battery or solar panel that supplies the electrical power. In other embodiments, electronic system 200 is supported by an external power source. In some embodiments, electronic system 200 is further equipped with a display 250, such that panoramic photos may be presented to a user instantly after image capture, and panoramic videos may be displayed to a user in real time as the scenes are being filmed.

In some embodiments, the present electronic system 200 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 280, online video streaming and file sharing 282, remote surveillance 284, and alert 286 for home and public security.

Figure 3:
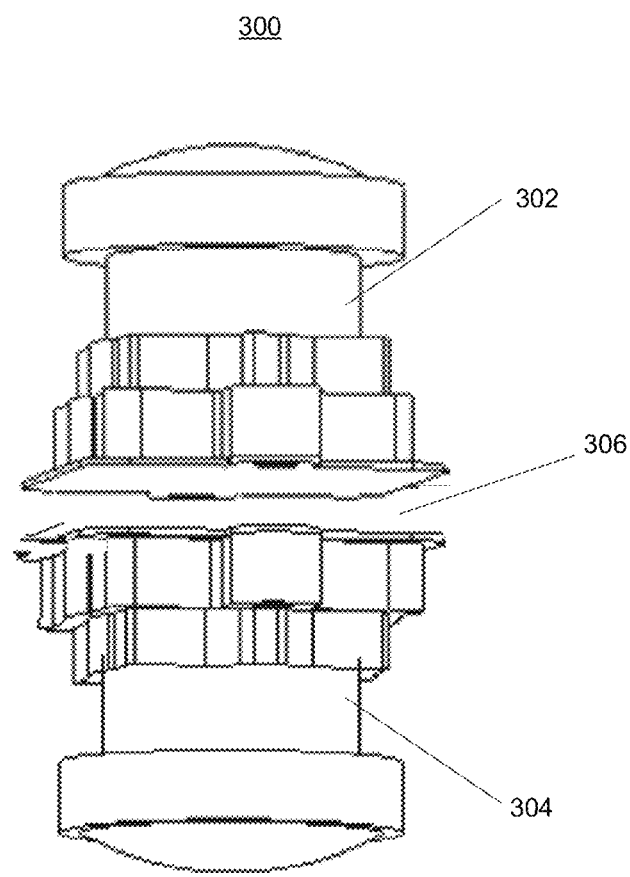
FIG. 3 shows an exemplary panoramic camera assembly comprising two fisheye lens cameras in a directly back-to-back configuration.

FIG. 3 shows an exemplary panoramic camera assembly 300 comprising two fisheye lens cameras in a directly back-to-back configuration. Note that panoramic camera assembly 300 may be used within panoramic imaging system 100 in place of cameras 101, 102 and 103. As can be seen in FIG. 3, the exemplary panoramic camera assembly 300 includes two fisheye lens cameras 302 and 304 arranged in a direct back-to-back configuration such that two cameras 302 and 304 are substantially coaxial and have a mirror symmetry. Although not shown, panoramic camera assembly 300 also includes a camera mount positioned in a gap 306 between the back sides of cameras 302 and 304 for attaching and fastening cameras 302 and 304. In some embodiments, this camera mount also includes electrical connectors and electronics such as IC chips for coupling, transmitting, and processing image signals gathered by fisheye lens cameras 302 and 304. Note that the physical configuration of panoramic camera assembly 300 can result in a bulky panoramic imaging system 100 with a large thickness/height when each of cameras 302 and 304 has a large dimension in the vertical, i.e., the optical axis direction. Moreover, because the lenses of cameras 302 and 304 are separated by a large distance, panoramic camera assembly 300 can also suffer from issues such as large parallax between the images captured by the two cameras 302 and 304, and large gaps between the images captured by cameras 302 and 304 when they are being stitched together to generate panoramic images.

Instead of using the direct back-to-back configuration shown in FIG. 3, some embodiments of the present disclosure provide panoramic imaging systems based on two laterally-offset vertically-overlap ultra wide-angle-lens cameras. As can be observed in the example of FIG. 3, when the two cameras shown in FIG. 3 are sufficiently separated in the horizontal/lateral direction, i.e., the direction perpendicular to the optical axis of the cameras, the two cameras can then be brought much closer in the vertical/optical axis direction, because neither camera will be physically blocking the other camera in that direction. As a result, panoramic imaging systems based on two laterally-offset vertically-overlap cameras can be constructed to have much smaller dimensions in the vertical/optical axis direction, thereby reducing the overall size of the imaging devices and therefore making them more suitable for carrying. Furthermore, by significantly reducing the distance between the two ultra wideangle-lens cameras, the aforementioned issues of large parallax and large stitching gaps between the two channels of image data associated with panoramic imaging systems based on panoramic camera assembly 300 of FIG. 3 can be significantly mitigated.

Figure 4:
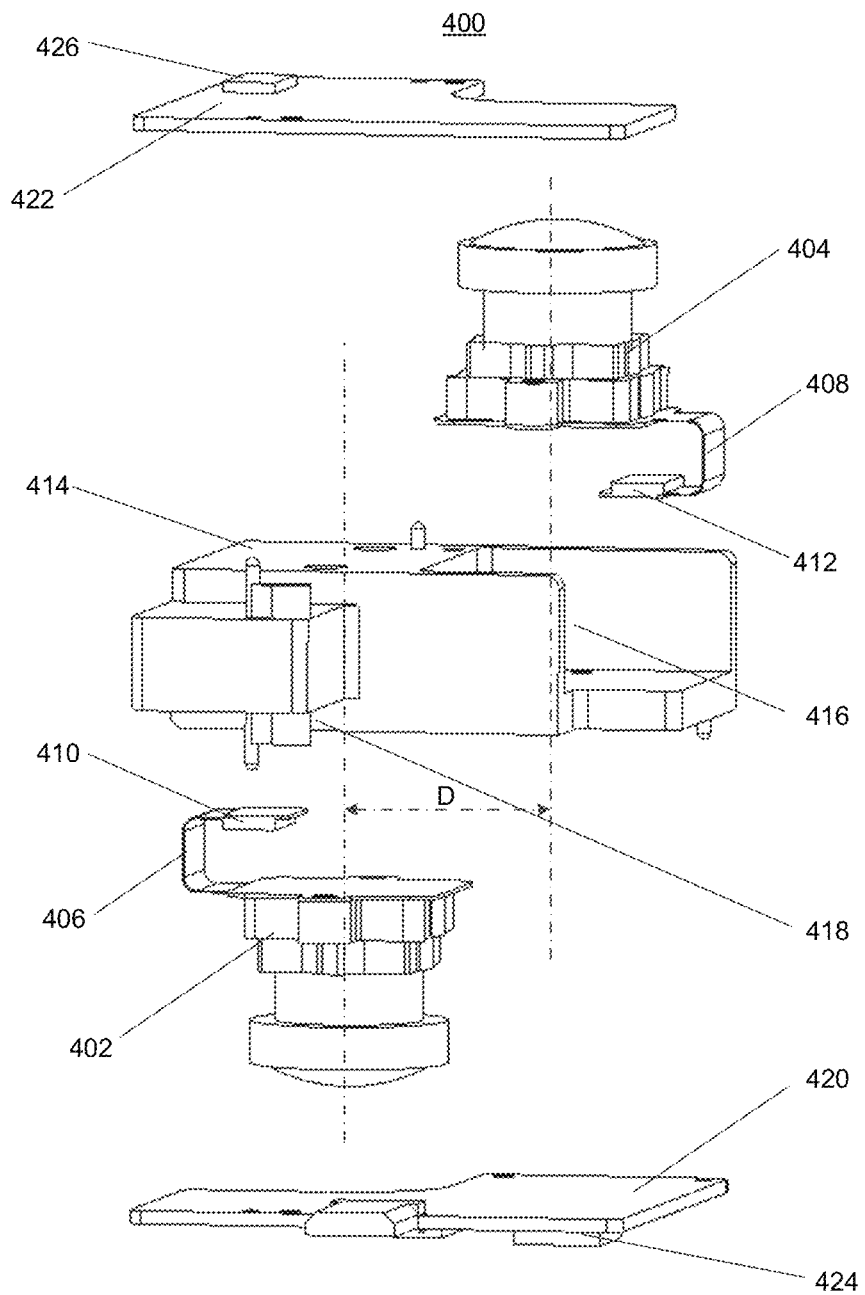
FIG. 4 shows an exploded view of an exemplary panoramic camera assembly in accordance with some embodiments described herein.

FIG. 4 shows an exploded view of an exemplary panoramic camera assembly 400 in accordance with some embodiments described herein. Note that panoramic camera assembly 400 may be used within panoramic imaging system 100 in place of cameras 101, 102 and 103. As can be seen in FIG. 4, panoramic camera assembly 400 includes a first camera module 402 and a second camera module 404 which are laterally offset with respect to each other. The lateral offset between the two lens modules is denoted as D. In some embodiments, each of the camera modules 402 and 404 includes an ultra wide-angle-lens camera configured to capture at least one half of a full 360°×180° full spherical space. In some embodiments, each of the ultra wide-angle-lens cameras is a fisheye lens camera. In the discussion below, the first camera module 402 and the second camera module 404 are described in terms of a fisheye lens module 402 and a fisheye lens module 404. However, as mentioned above, the first camera module 402 and the second camera module 404 can be constructed based on other types of ultra wide-angle-lens cameras other than fisheye lens cameras without departing from the scope of the present disclosure.

Referring back to FIG. 4, note that fisheye lens module 402 also includes a flexible printed circuit (FPC) 406 which is coupled to the sensors of fisheye lens module 402. Similarly, fisheye lens module 404 also includes a FPC 408 which is coupled to the sensors of the fisheye lens module 404. Note that each of the FPCs 406 and 408 includes an extended portion which is bent away from the respective fisheye lens module so that the end of the extended portion keeps a certain distance from the bottom of the respective fisheye lens module. In some embodiments, an electrical connector, such as contact pads 410 and 412 can be disposed onto the end of the extended portion of each of the FPCs 406 and 408, respectively.

Panoramic camera assembly 400 also includes a camera mount 414 positioned between fisheye lens modules 402 and 404. As can be seen in FIG. 4, camera mount 414 includes a hollow space 416 on the top right side of camera mount 414 configured to receive fisheye lens module 404. Hence, when assembled, a large portion of fisheye lens module 404 is positioned inside hollow space 416. In some embodiments, when fisheye lens module 404 is positioned inside hollow space 416, only the apex/crown portion of the fisheye lens of fisheye lens module 404 is positioned above the top surface of camera mount 414. Similarly but hidden from the view of FIG. 4, camera mount 414 also includes a hollow space 418 located at the bottom left portion of camera mount 414 and configured to receive fisheye lens module 402. Hence, when assembled, a large portion of fisheye lens module 402 is positioned inside hollow space 418. In some embodiments, when fisheye lens module 402 is positioned inside hollow space 418, only the apex/crown portion of the fisheye lens of fisheye lens module 402 is positioned above the bottom surface of camera mount 414.

Panoramic camera assembly 400 additionally includes a primary circuit board 420 which, when assembled, is to be attached to the bottom of camera mount 414. Panoramic camera assembly 400 further includes a secondary circuit board 422 which, when assembled, is to be attached to the top of camera mount 414. Note that secondary circuit board 422 is configured with a cut-out shape in the area directly over hollow space 416 so that fisheye lens module 404 can extend above the surface of secondary circuit board 422 when assembled without being obstructed by secondary circuit board 422. Similarly, primary circuit board 420 is configured with a cut-out shape in the area directly below hollow space 418 so that fisheye lens module 402 can extend above the surface of secondary circuit board 420 when assembled without being obstructed by primary circuit board 420. Also shown in FIG. 4, each of the primary and secondary circuit boards 420 and 422 includes an electrical connector, e.g., contact pad 424 and contact pad 426 on circuit boards 420 and 422, respectively. In some embodiments, when panoramic camera assembly 400 is assembled, contact pad 412 at the end of the extended portion of FPC 408 is electrically coupled to contact pad 424 on the primary circuit board 420 while contact pad 410 at the end of the extended portion of FPC 406 is electrically coupled to contact pad 426 on the second circuit board 422. This configuration is described in more detail below in conjunction with FIG. 5B.

In some embodiments, to assemble camera mount 414 with primary and second circuit boards 420 and 422, camera mount 414 includes posts whereas primary and second circuit boards 420 and 422 include holes at corresponding locations so that primary and second circuit boards 420 and 422 can be affixed to camera mount 414 with screws. A person having ordinary skill in the art can appreciate that, while the embodiment of panoramic camera assembly 400 is configured with primary and second circuit boards 420 and 422 which can be physically detached from camera mount 414, other embodiments of the present technique can configure camera mount 414 such that the top and bottom surfaces of camera mount 414 can be used as the PCBs so that electronics and electrical connectors in the primary and second circuit boards 420 and 422 can be mounted directly over these surfaces. As a result, separate circuit boards like circuit boards 420 and 422 are not needed.

Figure 5A:
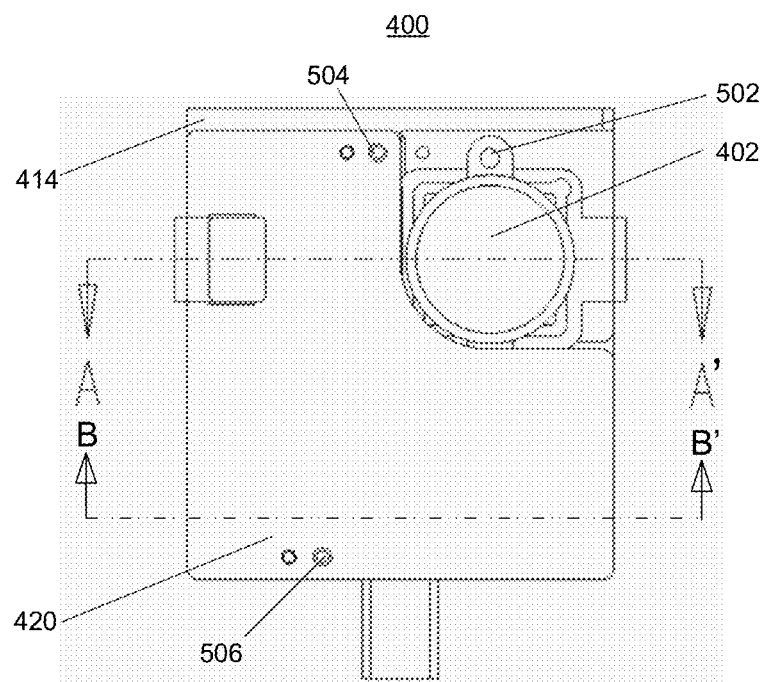
FIG. 5A shows a bottom view of the panoramic camera assembly of FIG. 4 wherein the individual components have been assembled together in accordance with some embodiments described herein.

FIG. 5A shows a bottom view (i.e., looking toward fisheye lens module 402) of panoramic camera assembly 400 wherein the individual components shown in FIG. 4 have been assembled together in accordance with some embodiments described herein. As can be seen in FIG. 5A, fisheye lens module 402 occupies the upper right half of the panoramic camera assembly 400. In the embodiment shown, a screw 502 is used to affix fisheye lens module 402 to the camera mount 414. Also visible in FIG. 5A is the primary circuit board 420 which is positioned and affixed to camera mount 414 by two screws at locations 504 and 506. Note that primary circuit board 420 is configured to have the upper right region cut out to allow the top of fisheye lens module 402 to be positioned above the surface of primary circuit board 420 without being obstructed by primary circuit board 420. Although not visible, the other fisheye lens module 404 is positioned directed to the left of fisheye lens module 402 in the upper left half of the panoramic camera assembly 400. As mentioned above, there is sufficient lateral offset between fisheye lens module 402 and fisheye lens module 404 so that their footprints do not overlap in the lateral direction. This allows the two lens modules to be positioned almost side-by-side in the lateral direction while pointing to opposite directions within camera mount 414 to cover the two halves of the 360°×180° full spherical space. Secondary circuit board 422, which is also not readily visible, is affixed to camera mount 414 from the top side of panoramic camera assembly 400. Similarly, secondary circuit board 422 is configured to have the upper left region cut out to allow the top of fisheye lens module 404 to be positioned above the surface of secondary circuit board 422 without being obstructed by secondary circuit board 422. In some embodiments, fisheye lens module 404 is affixed to camera mount 414 in the similar manner as fisheye lens module 402 (i.e., by a single screw), whereas secondary circuit board 422 is positioned and affixed to camera mount 414 in the similar manner as primary circuit board 420 (i.e., by two screws).

Figure 5B:
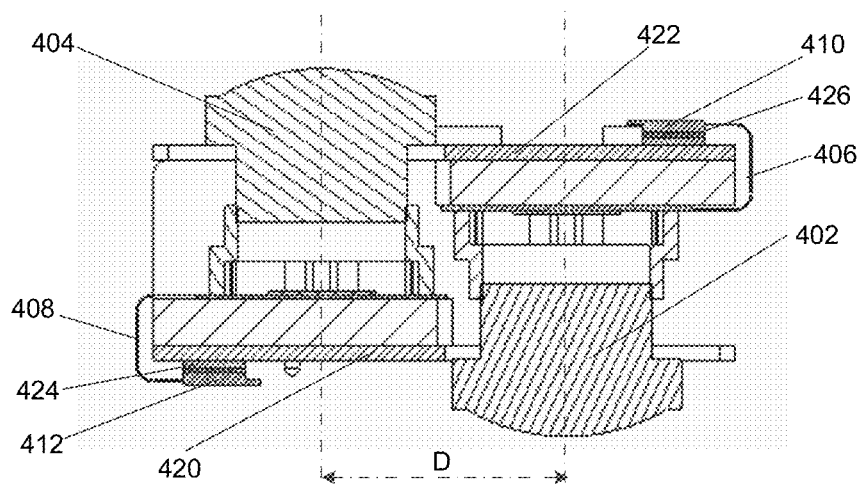
FIG. 5B shows a cross-sectional view of the panoramic camera assembly 400 along a dashed line AA' in FIG. 5A in accordance with some embodiments described herein.

FIG. 5B shows a cross-sectional view of panoramic camera assembly 400 along a dashed line AA' shown in FIG. 5A in accordance with some embodiments described herein. As can be seen in FIG. 5B, both fisheye lens module 402 and fisheye lens module 404 are clearly visible wherein fisheye lens module 404 is positioned at upper left of the assembly and fisheye lens module 402 is positioned at lower right of the assembly. FIG. 5B also shows the sufficient amount of lateral offset (i.e., "distance D") between the two lens modules allows the two lens modules to be placed "side-by-side" in the lateral direction with a large amount of overlap in the vertical direction while pointing to the opposite directions to cover each hemispherical space of the 360°×180° full spherical space. As a result, the total height/thickness of panoramic camera assembly 400 is significantly less than the combined height/thickness of fisheye lens modules 402 and 404 (e.g., when compared to panoramic camera assembly 300), thereby reducing the overall size of panoramic camera assembly 400. Hence, when panoramic camera assembly 400 is used within a panoramic imaging system such as panoramic imaging system 100, the housing of the system, such as housing 120 and hence the overall size of the panoramic imaging system can be made significantly smaller than a panoramic imaging system using panoramic camera assembly 300.

In the embodiment of FIG. 5B, contact pad 410 of fisheye lens module 402 is electrically coupled to the contact pad 426 on second circuit board 422 while contact pad 412 of fisheye lens module 404 is electrically coupled to the contact pad 424 on primary circuit board 420. Using this arrangement, image data collected by fisheye lens module 402 can be transmitted to the second circuit board 422 by way of FPC 406 and the coupling between contact pads 410 and 426, whereas image data collected by fisheye lens module 404 can be transmitted to the primary circuit board 420 by way of FPC 408 and the coupling between contact pads 412 and 424.

Figure 5C:
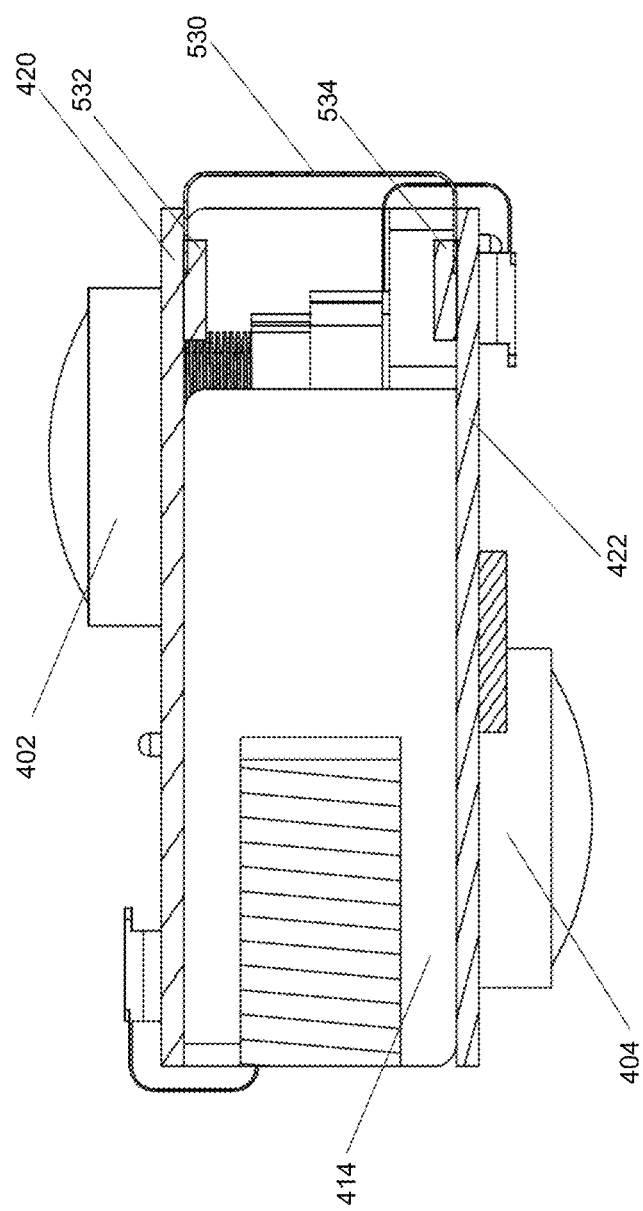
FIG. 5C shows a cross-sectional view of the panoramic camera assembly 400 along a dashed line BB' in FIG. 5A to show an exemplary connection between the primary circuit board and the second circuit board in accordance with some embodiments described herein.

Furthermore, primary circuit board 420 and second circuit board 422 can be electrically coupled through another FPC. For example, FIG. 5C shows a cross-sectional view of panoramic camera assembly 400 along a dashed line BB' in FIG. 5A to show an exemplary connection between primary circuit board 420 and second circuit board 422 in accordance with some embodiments described herein. As can be seen in FIG. 5C, an FPC 530 is positioned on a side of camera mount 414 and electrically connected to primary circuit board 420 and second circuit board 422 through electrical connectors 532 and 534 located on each of primary circuit board 420 and second circuit board 422, respectively. By way of this electrical path between the primary and secondary circuit boards, image data gathered by second circuit board 422 can be subsequently transmitted to primary circuit board 420. In some embodiments, primary circuit board 420 includes at least one main IC chip which is configured to combine the two channels of image data originated from the two lens modules 402 and 404 and transmit the two channels of image data, for example, via a USB port to a processor within the corresponding panoramic imaging system, such as panoramic imaging system 100, that includes the disclosed control system, such as control system 110 for panoramic image generation.

Figure 6:
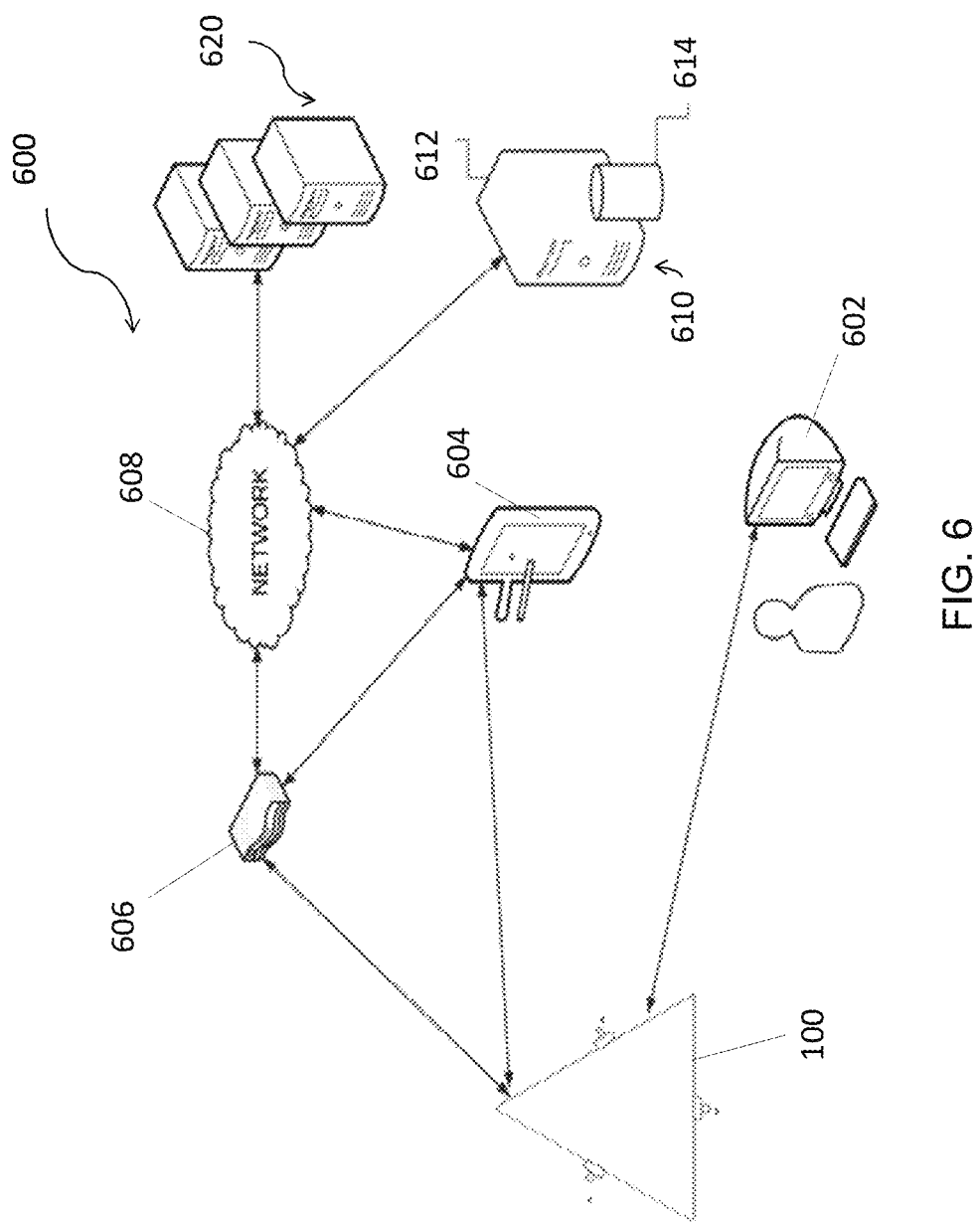
FIG. 6 illustrates an example network environment which provides for capturing and processing panoramic photographs and videos.

FIG. 6 illustrates an example network environment which provides for capturing and processing panoramic photographs and videos. Not all of the depicted components may be used, however, and one or more implementations may include additional components not shown in the figure. Variations in the arrangement and type of the components may be made without departing from the scope of the subject technology. Additional components, different components, or fewer components may be provided.

Network environment 600 includes panoramic imaging system 100 which itself can include the disclosed panoramic camera assembly 400, computing devices 602 and 604 communicably connected to servers 610 and 620 via network 608. Computing devices 602 and 604 may access network 608 via wireless access point 606.

Each of computing devices 602 and 604 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 602 and 604 may be provided access to or receive application software executed or stored on any of other computing devices 602 and 604.

Server 610 can include computing device 612 and computer-readable storage device 614 (e.g., data stores). Each of servers 610 and 620 may be a system or device having a processor, a memory, and communications capability for providing content and/or services to the computing devices. In some example aspects, each of servers 610 and 620 can be a single computing device, for example, a computer server. In other embodiments, each of servers 610 and 620 can represent more than one computing device working together to perform the actions of a server computer (e.g., cloud computing). Further, each of servers 610 and 620 can represent various forms of servers including, but not limited to an application server, a proxy server, a network server, an authentication server, an electronic messaging server, a content server, a server farm, etc., accessible to computing devices 602 and 604. For example, server 610 may be a web server that delivers web content accessible through network 608.

A user may interact with the content and/or services provided by servers 610 and 620, through a client application installed at computing devices 602 and 604. Alternatively, the user may interact with the system through a web browser application at computing devices 602 and 604. Communication between computing devices 602 and 604 and servers 610 and 620 may be facilitated through network 608.

In some aspects, computing devices 602 and 604 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

As described above with reference to FIG. 1, panoramic imaging system 100 of FIG. 1 includes two or more cameras, control system 110 and housing 120. In some aspects, panoramic imaging system 100 may be a handheld device with 360-degree panorama real-time recording and broadcasting capabilities. Panoramic imaging system 100 may be used to capture horizontal 360-degree panoramic image data within a front, rear, left and right direction of panoramic imaging system 100 and achieve real-time broadcasting and sharing of the image data. Panoramic imaging system 100 may generate 360-degree panoramic image data by imaging stitching and construction, and send to computing devices 602 and 604 via a wireless communication method, and/or store the encoded image data locally on panoramic imaging system 100, for example, on a Secure Digital (SD) Card.

In some aspects, panoramic imaging system 100 may send the generated 360-degree panoramic image data to computing device 604, for example, including a smartphone, for live broadcast via a wireless communication method. In some aspects, panoramic imaging system 100 may send the generated 360-degree panoramic image data to the cloud via wireless access point 606 to achieve cloud data storage and sharing. 360-degree panoramic image data in the cloud can be broadcast in computing device 604, such as smart devices and/or a web end device. In some aspects, panoramic imaging system 100 may send the 360-degree panoramic image data to computing device 602 for storage and playback via Universal Serial Bus (USB) 3.0 standard. In some aspects, panoramic imaging system 100 may send the 360-degree panoramic image data to computing device 602 for playback via a High-Definition Multimedia Interface (HDMI). In some aspects, panoramic imaging system 100 may store the encoded 360-degree panoramic image data in a SD Card on panoramic imaging system 100.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A panoramic camera assembly, comprising:
a first camera module including (a) a first wide-angle-lens camera and positioned such that an optical axis of the first wide-angle-lens camera points to a vertical direction to cover one half of a full spherical space and (b) a first flexible printed circuit (FPC) coupled to sensors of the first wide-angle-lens camera at a first end of the first FPC, and the first FPC includes a first electrical connector at a second end of the first FPC which is electrically coupled to the first circuit board; and
a second camera module including (c) second wide-angle-lens camera and positioned such that an optical axis of the second wide-angle-lens camera points to a second direction opposite to the vertical direction to cover the other half of the full spherical space and (d) a second FPC coupled to sensors of the second wide-angle-lens camera at a first end of the second FPC, and the second FPC includes a second electrical connector at a second end of the second FPC which is electrically coupled to the second circuit board;
a camera mount positioned between the first camera module and the second camera module, including (e) a first hollow space on a top right side of the camera mount configured to receive the first camera module and (f) a second hollow space located at a bottom left portion of the camera mount and configured to receive the second camera module;
a first circuit board having a third electrical connector and attached to the camera mount;
a second circuit board having a fourth electrical connector and attached to the camera mount;
a third FPC positioned on a side of the camera mount and electrically connected to the first circuit board and the second circuit board through electrical connectors located on each of the first circuit board and the second circuit board, respectively;
wherein the optical axis of the first wide-angle-lens camera and the optical axis of the second wide-angle-lens camera are separated by a predetermined distance in a lateral direction perpendicular to the vertical direction, and the first wide-angle-lens camera and the second wide-angle-lens camera are arranged in a direct back-to-back configuration such that the first wide-angle-lens camera and the second wide-angle-lens camera have a mirror symmetry;
wherein the first camera module and the second camera module are positioned to have a predetermined amount of overlap in the vertical direction so that a height of the panoramic camera assembly between a first apex of the first wide-angle-lens camera and a second apex of the second wide-angle-lens camera in the vertical direction is smaller than a dimension of the first camera module in the vertical direction plus a dimension of the second camera module in the vertical direction; and
the first electrical connector at the end of an extended portion of the first FPC is electrically coupled to the fourth electrical connector of the second circuit board while the second electrical connector at the end of an extended portion of the second FPC is electrically coupled to the third electrical connector on the first circuit board.

2. The panoramic camera assembly of claim 1, wherein each of the first and second wide-angle-lens cameras is a fisheye lens camera.

3. The panoramic camera assembly of claim 1, wherein the predetermined distance in the lateral direction is equal to or greater than a dimension of the first camera module or the second camera module in the lateral direction.

4. The panoramic camera assembly of claim 1, wherein the predetermined amount of overlap in the vertical direction is greater than one half of the dimension of the first camera module or the second camera module in the vertical direction.

5. The panoramic camera assembly of claim 1,
wherein the first hollow space is offset from the second hollow space in the lateral direction so that the first hollow space and the second hollow space do not overlap in the lateral direction, and wherein the first hollow space overlaps with the second hollow space in the vertical direction.

6. The panoramic camera assembly of claim 5,
wherein the first camera module is positioned within the first hollow space while the first apex of the first wide-angle-lens camera is positioned above the first surface of the camera mount; and
wherein the second camera module is positioned substantially within the second hollow space while the second apex of the second wide-angle-lens camera is positioned above the second surface of the camera mount.

7. The panoramic camera assembly of claim 5, wherein the first circuit board includes a first set of electronics and electrical connectors, and wherein the second circuit board includes a second set of electronics and electrical connectors.

8. The panoramic camera assembly of claim 1, wherein the first camera module is configured to couple image data gathered by the first camera module to the first circuit board through the first FPC and wherein the second camera module is configured to couple image data gathered by the second camera module to the second circuit board through the second FPC.

9. The panoramic camera assembly of claim 1, wherein the second circuit board is configured to transmit the image data gathered by the second camera module to the first circuit board through the third FPC.

10. The panoramic camera assembly of claim 1, wherein the first circuit board includes an IC chip configured to combine the image data gathered by the first camera module and the second camera module and transmit the combined image data to a processor to generate full panoramic images.

11. A panoramic imaging system, comprising:
a protective housing;
a controller that includes at least one processor and enclosed by the protective housing; and a panoramic camera assembly electrically coupled to the controller, wherein the panoramic camera assembly includes:
a first camera module including (a) a first wide-angle-lens camera and positioned such that an optical axis of the first wide-angle-lens camera points to a vertical direction to capture one half of a full spherical space and (b) a first flexible printed circuit (FPC) coupled to sensors of the first wide-angle-lens camera at a first end of the first FPC, and the first FPC includes a first electrical connector at a second end of the first FPC which is electrically coupled to the first circuit board;
a second camera module including a second wide-angle-lens camera and positioned such that an optical axis of the second wide-angle-lens camera points to a second direction opposite to the vertical direction to capture the other half of the full spherical space and (d) a second FPC coupled to sensors of the second wide-angle-lens camera at a first end of the second FPC, and the second FPC includes a second electrical connector at a second end of the second FPC which is electrically coupled to the second circuit board;
a camera mount positioned between the first camera module and the second camera module, including (e) a first hollow space on a top right side of the camera mount configured to receive the first camera module and (f) a second hollow space located at a bottom left portion of the camera mount and configured to receive the second camera module;
a first circuit board having a third electrical connector and attached to the camera mount;
a second circuit board having a fourth electrical connector and attached to the camera mount;
a third FPC positioned on a side of the camera mount and electrically connected to the first circuit board and the second circuit board through electrical connectors located on each of the first circuit board and the second circuit board, respectively;
wherein the optical axis of the first wide-angle-lens camera and the optical axis of the second wide-angle-lens camera are separated by a predetermined distance in a lateral direction perpendicular to the vertical direction, and the first wide-angle-lens camera and the second wide-angle-lens camera are arranged in a direct back-to-back configuration such that the first wide-angle-lens camera and the second wide-angle-lens camera have a mirror symmetry;
wherein the first camera module and the second camera module are positioned to have a predetermined amount of overlap in the vertical direction so that a height of the panoramic camera assembly between a first apex of the first wide-angle-lens camera and a second apex of the second wide-angle-lens camera is significantly smaller in the vertical direction than a dimension of the first camera module in the vertical direction plus a dimension of the second camera module in the vertical direction; and
the first electrical connector at the end of an extended portion of the first FPC is electrically coupled to the fourth electrical connector of the second circuit board while the second electrical connector at the end of an extended portion of the second FPC is electrically coupled to the third electrical connector on the first circuit board.

12. The panoramic imaging system of claim 11, wherein each of the first and second wide-angle-lens cameras is a fisheye lens camera.

13. The panoramic imaging system of claim 11, wherein the predetermined distance in the lateral direction is equal to or greater than a dimension of the first camera module or the second camera module in the lateral direction.

14. The panoramic imaging system of claim 11, wherein the predetermined amount of overlap in the vertical direction is greater than one half of the dimension of the first camera module or the second camera module in the vertical direction.

15. The panoramic imaging system of claim 11,
wherein the first hollow space is offset from the second hollow space in the lateral direction so that the first hollow space and the second hollow space do not overlap in the lateral direction, and wherein the first hollow space overlaps with the second hollow space in the vertical direction.

16. The panoramic imaging system of claim 15, wherein the first camera module is positioned within the first hollow space while the first apex of the first wide-angle-lens camera is positioned above the first surface of the camera mount; and wherein the second camera module is positioned within the second hollow space while the second apex of the second wide-angle-lens camera is positioned above the second surface of the camera mount.

17. The panoramic imaging system of claim 15, wherein the first circuit board includes a first set of electronics and electrical connectors, and wherein the second circuit board includes a second set of electronics and electrical connectors.

18. The panoramic imaging system of claim 17, wherein the first camera module is configured to couple image data gathered by the first camera module to the first circuit board and wherein the second camera module is configured to couple image data gathered by the second camera module to the second circuit board.

19. The panoramic imaging system of claim 17, wherein the second circuit board is configured to transmit the image data gathered by the second camera module to the first circuit board through the first FPC.

20. The panoramic imaging system of claim 17, wherein the first circuit board includes an IC chip configured to:

combine the image data gathered by the first camera module and the second camera module; and transmit the combined image data to controller to generate full panoramic images by the at least one processor.

\* \* \* \* \*